US012785601B2

(12) United States Patent
Lemmer et al.

(10) Patent No.: US 12,785,601 B2

(45) Date of Patent: Nov. 3, 2026

(54) CONTROL DEVICE AND METHOD FOR OPERATING AN ELECTRIC MOTOR, IN PARTICULAR OF A STEERING SYSTEM

(71) Applicant: Robert Bosch GmbH, Stuttgart (DE)

(72) Inventors: Paul Lemmer, Goeggingen (DE); Andreas Nagel, Schwaebisch Gmuend (DE); Markus Weber, Goeppingen (DE); Jonas Schmidt, Auenwald (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 18/698,568

(22) PCT Filed: Sep. 19, 2022

(86) PCT No.: PCT/EP2022/075888

§ 371 (c)(1),
(2) Date: Apr. 4, 2024

(87) PCT Pub. No.: WO2023/057192

PCT Pub. Date: Apr. 13, 2023

(65) Prior Publication Data

US 2024/0421741 A1 Dec. 19, 2024

(30) Foreign Application Priority Data

Oct. 5, 2021 (DE) ..................... 10 2021 211 208.0

(51) Int. Cl.
*H02P 27/06* (2006.01)

(52) U.S. Cl.
CPC .................................... *H02P 27/06* (2013.01)

(58) Field of Classification Search
CPC ........ H02P 27/06; H02P 25/22; H02P 29/028; H02P 29/0241; H02P 6/085; H02P 25/18;
(Continued)

(56) References Cited

U.S. PATENT DOCUMENTS

| | | | | |
|---|---|---|---|---|
| 2019/0097565 A1* | 3/2019 | Hayakawa | .............. | H02P 6/085 |
| 2021/0159897 A1 | 5/2021 | Watanabe | | |

FOREIGN PATENT DOCUMENTS

| | | |
|---|---|---|
| CN | 106712613 A | 5/2017 |
| DE | 38 12 317 A1 | 11/1988 |

(Continued)

OTHER PUBLICATIONS

International Search Report corresponding to PCT Application No. PCT/EP2022/075888, mailed Jan. 18, 2023 (German and English language document) (6 pages).

*Primary Examiner* — Antony M Paul

(74) *Attorney, Agent, or Firm* — Maginot, Moore & Beck LLP

(57) ABSTRACT

A control device for operating an electric motor, in particular of a steering system, includes (i) a power electronics system, (ii) a primary driver unit which is intended to actuate the power electronics system in a normal operating state, and (iii) a secondary driver unit which is connected in parallel with the primary driver unit and is intended to actuate the power electronics system in at least one fault operating state in which a malfunction and/or failure of the primary driver unit occurs. The primary driver unit and the secondary driver unit each have an integrated tri-state functionality and the second driver unit is in a high-impedance state in the normal operating state.

9 Claims, 3 Drawing Sheets

(58) Field of Classification Search
CPC ...... H02P 29/024; H02P 27/08; H02P 25/022; H02P 25/03; H02P 25/064; H02P 25/062; H02P 29/027; H02P 2101/45; H02P 2207/05; H02P 2209/05; H02P 1/24; H02P 1/26; H02P 6/12; B62D 5/0487; B62D 5/046; B62D 5/0463; B62D 5/0481; B62D 5/0493; B62D 5/0409; B62D 5/049; B62D 6/10; B62D 5/0484; H02M 1/0009; H02M 7/5387; B60L 2210/40; H02K 11/33; H02J 7/0047; H02J 9/062
See application file for complete search history.

(56) References Cited

FOREIGN PATENT DOCUMENTS

| | | | |
|---|---|---|---|
| DE | 10 2020 202 364 | A1 | 8/2021 |
| EP | 3 065 290 | A1 | 9/2016 |
| JP | 2005-117758 | A | 4/2005 |

* cited by examiner

CONTROL DEVICE AND METHOD FOR OPERATING AN ELECTRIC MOTOR, IN PARTICULAR OF A STEERING SYSTEM

This application is a 35 U.S.C. § 371 National Stage Application of PCT/EP2022/075888, filed on Sep. 19, 2022, which claims the benefit of priority to Serial No. DE 10 2021 211 208.0, filed on Oct. 5, 2021 in Germany, the disclosures of which are incorporated herein by reference in their entirety.

BACKGROUND

The disclosure relates to a control device for operating an electric motor, in particular of a steering system, as well as a method for operating an electric motor, in particular by way of such a control device. In addition, the disclosure relates to an actuator assembly having such a control device, as well as a steering system having such an actuator assembly.

From the prior art, control devices for operating electric motors with a plurality of driver units in the form of half bridge drivers and/or gate drivers are known, wherein the driver units can be provided for actuating different power electronics or a single power electronics. In the latter case, for example, the driver units can serve to meet redundancy specifications, so that even in the event of a fault, an actuation of the power electronics can be achieved and consequently, operation of the electric motor can be maintained. However, if the driver units are switched in parallel and provided in order to actuate the same power electronics, then a current flow from the primary and/or active driver unit into the secondary and/or passive driver unit must be prevented or at least reduced in operation. In known control devices, additional switches and/or resistors are used for this purpose, for example. However, these known capabilities result in reduced power efficiency and additional overhead as well as additional costs.

Proceeding from the above, the problem addressed by the disclosure is in particular to provide a control device as well as a method for operating an electric motor with improved properties in terms of operational safety. The problem is solved by the features of claims 1, 6, 7, and 8 while advantageous configurations and further developments of the disclosure can be found in the dependent claims.

SUMMARY

The disclosure proposes a control device for operating an electric motor, in particular of a steering system, comprising a power electronics system, comprising a primary driver unit which is intended to actuate the power electronics system in a normal operating state, and comprising a secondary driver unit which is connected in parallel with the primary driver unit and is intended to actuate the power electronics system in at least one fault operating state in which a malfunction and/or failure of the primary driver unit occurs, wherein the primary driver unit and the secondary driver unit each have an integrated tri-state functionality and the second driver unit is in a high-impedance state in the normal operating state. In addition, the primary driver unit is in an active state when in the normal operating state. Thus, in the present case, in the normal operating state, the primary driver unit is active and the secondary driver unit is passive and/or inactive. In the present case, the secondary driver unit is in particular intended to replace the primary driver unit in the fault operating state. In the fault operating state, the primary driver unit is then advantageously in a high-impedance state and the secondary driver unit is in an active state. Thus, in the fault operating state, the primary driver unit is passive and/or inactive and the secondary driver unit is active. For switching and/or changing between the primary driver unit and the secondary driver unit, the control device may comprise a switching unit, advantageously in the form of a computing unit. With this configuration, an efficiency, in particular a power efficiency, control efficiency, energy efficiency, space efficiency, component efficiency, and/or cost efficiency can be improved. In addition, an availability of the control device may advantageously be increased. In addition, a computational effort in particular can be minimized and/or a control algorithm can be simplified.

In this context, a "control device" is to be understood to mean at least one part, in particular a sub-assembly, an actuator assembly, and advantageously a steering system, which is provided in at least one operating state for controlling the operation of at least one electric motor of the actuator assembly. The electric motor is in particular configured as a servo motor, advantageously as a brushless motor, and particularly advantageously as an asynchronous motor or as a permanently excited synchronous motor. Preferably, the electric motor is provided as part of an auxiliary electric power steering and in particular for generating an electric steering assistance. The electric motor could be configured as a six-phase, nine-phase, or twelve-phase electric motor, for example. However, it is preferably proposed that the electric motor be configured as a three-phase electric motor. In addition, the power electronics system is configured as an inverter unit, in particular as an output stage and/or as a B6 bridge circuit, and are provided for powering and/or energizing the electric motor.

Furthermore, a "driver unit" is to be understood as an at least semi-electrically and/or electronically configured unit that is electrically connected to the power electronics, in particular a control terminal of at least one power switch of the power electronics, and is intended to control the at least one power switch and in particular to provide a control voltage and/or a control current for the at least one power switch. Preferably, the driver unit is provided in order to control all circuit breakers of the power electronics. Advantageously, the driver unit is configured as a half bridge driver and/or gate driver. Furthermore, the primary driver unit is advantageously configured as a master driver unit, while the secondary driver unit is configured as a slave driver unit. The primary driver unit and the secondary driver unit are redundant to one another and preferably identical in design. Particularly advantageously, the primary driver unit and/or the secondary driver unit is configured as integrated electronic circuit. Advantageously, the primary driver unit is provided in order to adjust a motor torque of the electric motor in the normal operating state, in particular by actuating the power electronics, and preferably a support torque of the electric motor. The secondary driver unit is operatively connected to the primary driver unit and is particularly intended to replace the primary driver unit in the fault operating state and to actuate the power electronics and consequently take control of operation of the electric motor. Advantageously, the primary driver unit in the normal operating state and the secondary driver unit in the fault operating state are provided in order to use at least partially the same and/or identical, in particular existing, assemblies and connection lines so as to actuate the power electronics and in particular to actuate the same circuit breakers and consequently to operate the same phases of the electric motor. Furthermore, the primary driver unit and the secondary driver unit can be advantageously operated independently from one another. In particular, the primary driver unit is provided in order to actuate the power electronics exclusively in the normal operating state and thereby change and/or vary a motor torque of the electric motor, preferably a support torque of the electric motor. In addition, the secondary driver unit is advantageously provided in order to actuate the power electronics exclusively in the fault operating state and thereby change and/or vary a motor torque of the electric motor, preferably a support torque of the electric motor. The phrase "a driver unit has tri-state functionality" is to be understood in particular as meaning that an output of the driver unit, in particular connected to the power electronics system, can assume at least three different states, wherein a first state corresponds to an active state, a second state corresponds to a deactivated state, and a third state corresponds to a high-impedance state and a "high Z" state. For this purpose, the driver unit may comprise a corresponding functional unit and/or functional electronics, for example. The phrase "a driver unit has an integrated tri-state functionality" is to be understood in particular as meaning that the tri-state functionality or a functional unit and/or functional electronics associated therewith, together with control electronics of the driver unit, are configured as integrated electronic circuitry. Accordingly, the tri-state functionality is in particular not realized via an external circuit. Moreover, "a malfunction and/or failure of the primary driver unit" is to be understood to mean, in particular, a malfunction and/or failure of the primary driver unit itself and/or of a periphery assembly cooperating with the primary driver unit, such as a power supply, and a malfunction of the primary driver unit caused thereby.

Furthermore, a "switching unit", is to be understood to mean, in particular, a unit, preferably electrically and/or electronically configured, which is electrically connected to the primary driver unit and/or the secondary driver unit and is provided for this purpose to change, by means of a switching signal in at least one operating state, a state of the primary driver unit, in particular, in particular of an output, in particular connected to the power electronics system, of the primary driver unit, and/or a state of the secondary driver unit, in particular of a further output, in particular connected to the power electronics, of the secondary driver unit. The output of the primary driver unit and/or the further output of the secondary driver unit can in particular be switched between the active state, the deactivated state and the high-impedance state, and the "high Z" state as a function of the switching signal. Furthermore, the term "computing unit" is in particular intended to mean an electrical and/or electronic unit which comprises an information input, an information processor, and an information output. Advantageously, the computing unit further comprises at least one processor, for example in the form of a microprocessor, at least one operational memory, at least one input and/or output means, and at least one operating program. The term "provided" is in particular intended to mean specifically programmed, designed, and/or equipped. The phrase "an object being provided for a specific function" is particularly intended to mean that the object fulfills and/or performs this specific function in at least one application and/or operating state.

For example, the tri-state functionality of the primary driver unit could be controlled via a corresponding software configuration or a software configuration bit. Advantageously, however, it is proposed that the primary driver unit has a control pin for controlling the tri-state functionality of the primary driver unit. In particular, the control pin is used to switch the output of the primary driver unit. Preferably, the switching unit and in particular the computing unit is electrically connected to the control pin, in particular such that the state of the primary driving unit can be changed by means of the switching signal. This may achieve particularly simple control of the tri-state functionality of the primary driver unit.

In addition, the tri-state functionality of the secondary driver unit could be controlled via a corresponding software configuration or a software configuration bit. According to a preferred embodiment, however, it is proposed that the secondary driver unit has a further control pin for controlling the tri-state functionality of the secondary driver unit. In particular, the further control pin serves to switch the further output of the secondary driver unit. Preferably, the switching unit, in particular the computing unit, is electrically connected to the further control pin, in particular such that the state of the secondary driving unit can be changed by means of the switching signal. By this, a particularly simple control of the tri-state functionality of the secondary driver unit can be achieved.

The control device could comprise a separate switching unit for switching and/or for changing between the primary driver unit and the secondary driver unit and a monitoring unit configured separately from the switching unit for monitoring operation of the primary driver unit in the normal operating state. According to a particularly preferred embodiment, however, it is proposed that the control device comprises a computing unit, in particular the aforementioned computing unit, which is provided to monitor operation of the primary driver unit in the normal operating state and, upon determining a malfunction and/or a failure of the primary driver unit, to deactivate the primary driver unit, in particular by actuating the further control pin with a corresponding switching signal, in particular by a change to the high-impedance state or "high Z" state, and to activate the secondary driver unit, in particular by actuating the further control pin with a corresponding switching signal, in particular by a change to the active state. In the present case, the computing unit is thus configured as a switching and monitoring unit and is provided to monitor the operation of the primary driver unit in the normal operating state. Furthermore, the computing unit is provided to change the state of the primary driver unit and the secondary driver unit by actuating the control pin and the further control pin. In particular, this can minimize a computational effort and/or simplify a control algorithm.

In addition, the disclosure relates to an actuator assembly having an electric motor, in particular the aforementioned electric motor, and to the aforementioned control device. Particularly preferably, the control device and the electric motor are part of a steering system, which is in particular provided for use in a vehicle, and preferably a motor vehicle.

Furthermore, a method for operating an electric motor is proposed, in particular by means of the aforementioned control device, in which a power electronics system is controlled in a normal operating state by means of a primary driver unit and in a fault operating state in which a malfunction and/or failure of the primary driver unit occurs, by means of a secondary driver unit connected in parallel with the primary driver unit, the primary driver unit and the secondary driver unit each having an integrated tri-state functionality and the secondary driver unit being in a high-impedance state in the normal operating state. This can achieve the aforementioned advantages. In particular, an efficiency, in particular a power efficiency, control efficiency, energy efficiency, space efficiency, component efficiency, and/or cost efficiency can be improved. In addition, an availability of the control device may advantageously be increased. In addition, a computational effort in particular can be minimized and/or a control algorithm can be simplified.

The control device, actuator assembly, steering system, and method are not intended to be limited to the application and embodiment described above. In order to carry out a function described herein, the control device, actuator assembly, steering system, and method can in particular comprise a number of individual elements, components, and units that differs from a number specified here.

BRIEF DESCRIPTION OF THE DRAWINGS

Further advantages will become apparent from the description of the drawings hereinafter. The drawings illustrate an exemplary embodiment of the disclosure.

Here.

DETAILED DESCRIPTION

The following embodiment example relates, by way of example, to a steering system. However, in principle, the disclosure is not limited to use in a steering system and could also be used in other areas of a vehicle, for example a wiping system, a window regulator system, and/or a drive system, and/or in other electronic systems, for example in the area of household appliances and/or machine tools.

Figure 1:
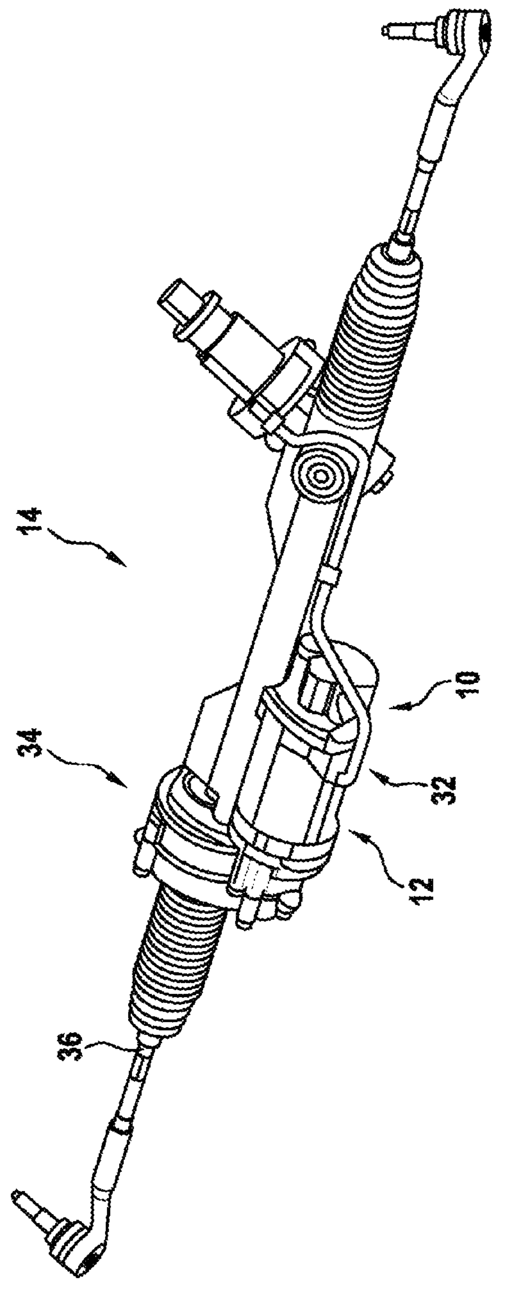
FIG. 1 a portion of an exemplary steering system with an actuator assembly comprising an electric motor and a control device in a perspective view, FIG. 2 the control device and the electric motor in a schematic diagram, and FIG. 3 an exemplary flowchart showing the main method steps of a method for operating the electric motor.

FIG. 1 shows at least a portion of an exemplary steering system 14 in a perspective view. In the present case, the steering system 14 is configured as an electrically assisted steering system. The steering system 14 is configured by way of example as a conventional steering system and comprises an auxiliary electric steering in the form of a power steering. Furthermore, the steering system 14 is provided for use in a vehicle (not shown), in particular a motor vehicle. In an installed state, the steering system 14 is operatively connected to the vehicle wheels (not shown), and is provided in order to influence a direction of travel of the vehicle. Alternatively, however, it is also contemplated to configure a steering system having an electrical superimposed steering and/or active steering. A steering system could furthermore in principle also be configured as a steer-by-wire steering system.

The steering system 14 comprises a steering gear 34, exemplarily designed as a rack and pinion steering gear, which is provided to convert a steering input into a steering movement of the vehicle wheels. For this purpose, the steering gear 34 comprises at least one steering adjustment element 36, which in the present case is designed in particular as a toothed rack.

Furthermore, the steering system 14 comprises at least one actuator assembly 32. The actuator assembly 32 is designed as a steering actuator and has an operative connection with the steering adjustment element 36. The actuator assembly 32 is provided to provide steering torque. In the present case, the actuator assembly 32 is intended to provide a steering torque in the form of an assistance torque and/or servo torque and to apply it, in particular for steering assistance, to the steering gear 34. Alternatively, however, an actuator assembly could also be part of an electrical superimposed steering and/or active steering, and is in particular provided for providing an additional steering angle and/or variable gear ratio. Furthermore, an actuator assembly could be part of a steer-by-wire steering system. In this case, the actuator assembly could be particularly provided for use in a wheel steering angle adjuster and in particular to provide a steering torque for direct control of a direction of travel of a vehicle. In this case, the wheel steering angle actuator can in particular be associated with a rear axle and/or a front axle of the vehicle. In this case, the actuator assembly could also be provided for use in a control unit of the steer-by-wire steering system and for providing a feedback torque and/or resetting torque to a steering handle. Furthermore, as mentioned above, an actuator assembly could also be used independently of a steering system.

The actuator assembly 32 comprises an electric motor 12 that is known in itself. The electric motor 12 is configured as a synchronous motor, in particular a permanently excited motor. The electric motor 12 is further configured as a multi-phase electric motor. In the present case, the electric motor 12 is configured by way of example as a three-phase electric motor. The electric motor 12 is operatively connected to the steering gear 34, in particular the steering adjustment element 36. The electric motor 12 is provided in order to generate the steering torque. In the present case, the electric motor 12 is part of the auxiliary electric power steering and is in particular used in order to generate the electric steering assistance. In principle, however, an electric motor could also be configured as a six-phase electric motor or have another suitable number of phases.

Figure 2:
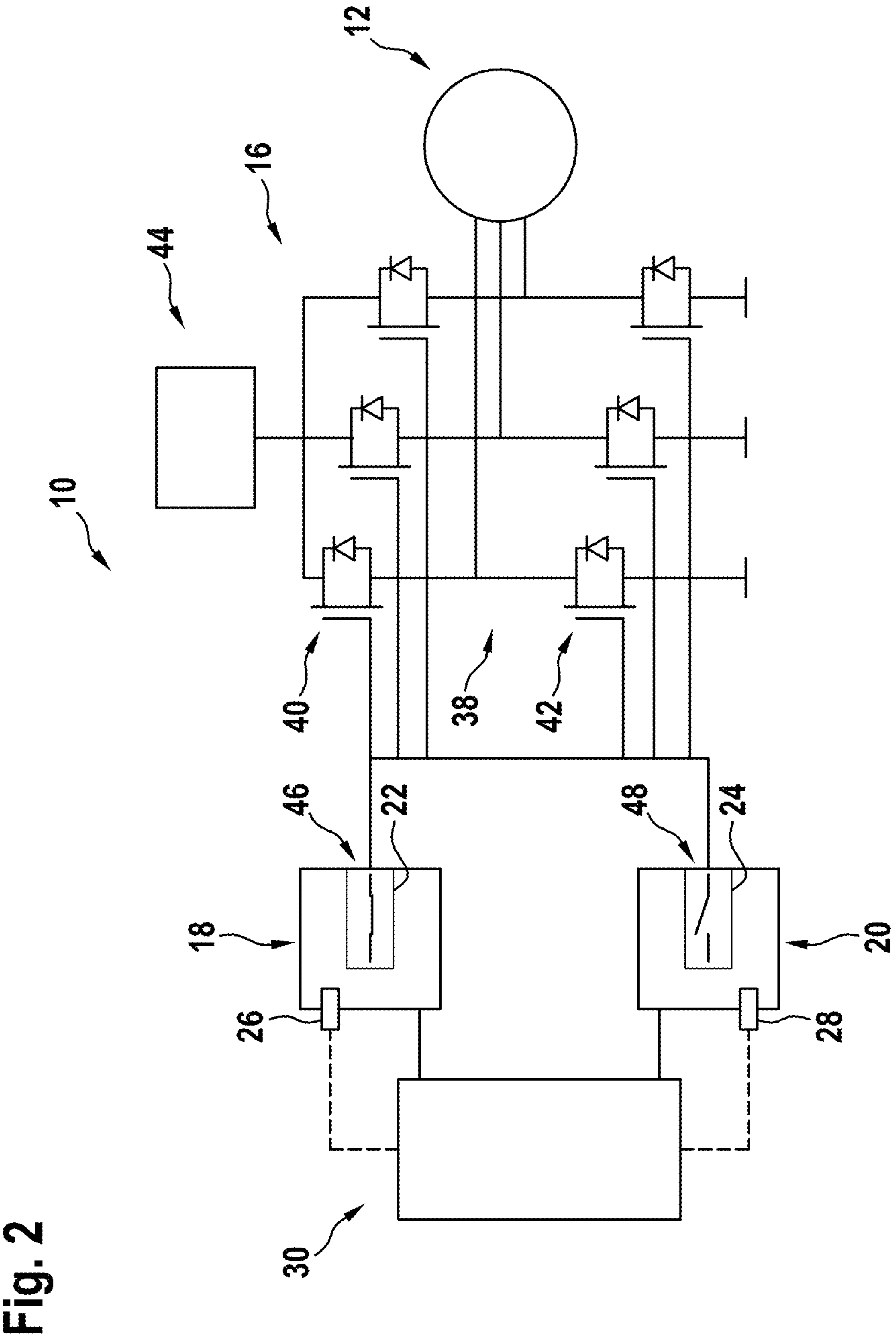

Furthermore, the actuator assembly 32 comprises a control device 10 (cf. in particular also FIG. 2). In the present case, control device 10 is configured as a control unit, in particular a steering control unit. The control device 10 is operatively connected to the electric motor 12 and is provided for controlling an operation of the electric motor 12.

The control device 10 comprises a computing unit 30. The computing unit 30 comprises at least one processor (not shown), for example in the form of a microprocessor. In the present case, the computing unit 30 comprises two or more processors, for example, whereby redundancy requirements can be advantageously met. In addition, the computing unit 30 can comprise at least one operational memory (not shown). Furthermore, the computing unit 30 comprises at least one operational program stored in the operational memory with at least one calculation routine and at least one control routine.

Furthermore, the control device 10 comprises a power electronics 16 known per se. The power electronics 16 are operatively connected to the computing unit 30 and positioned downstream therefrom. In addition, the power electronics 16 are operatively connected to the electric motor 12. In the present case, the power electronics system 16 is configured as an output stage, in particular as a B6 bridge circuit, and comprises a plurality of inverters 38, in particular identical to one another, wherein each phase of the electric motor 12 is associated with one of the inverters 38. For clarity, only one of the inverters 38 bears reference numerals in FIG. 2. Each of the inverters 38 comprises two circuit breakers 40, 42, in particular identical to one another, in particular a high-side circuit breaker 40 and a low-side circuit breaker 42. Each of the inverters 38 is provided in order to convert a pulsating rectified voltage of a power source 44, for example in the form of a vehicle battery, into a phase current and to supply it to the electric motor 12, in particular precisely one phase of the electric motor 12.

Moreover, the control device 10 comprises a primary driver unit 18. The primary driver unit 18 is operatively connected to the computing unit 30 and positioned downstream therefrom. In addition, the primary driver unit 18 is operatively connected to the power electronics system 16. Accordingly, the primary driver unit 18 is arranged between the computing unit 30 and the power electronics system 16. The primary driver unit 18 is configured as an integrated electronic circuit. The primary driver unit 18 is configured as a half bridge driver and/or gate driver. The primary driver unit 18 is provided in order to actuate at least one of the circuit breakers 40, 42 and, in particular, to provide a control voltage and/or a control current for the at least one circuit breaker 40, 42. In the present case, the primary driver unit 18 is provided by way of example to control all the circuit breakers 40, 42 of the power electronics system 16. In the present case, the primary driver unit 18 is provided at least in a normal operating state for actuating the power electronics system 16.

Because the steering system 14 is a safety-relevant vehicle component with a direct impact on the driver and/or vehicle guidance, in a fault operating state in which a malfunction and/or failure of the primary driver unit 18 itself and/or a periphery assembly cooperating with the primary driver unit 18, such as a power supply, and a malfunction of the primary driver unit 18 caused thereby occurs, a corresponding safety concept is required.

For this reason, the control device 10 further comprises a secondary driver unit 20. The secondary driver unit 20 is formed separately from the primary driver unit 18. The secondary driver unit 20 is configured redundantly to the primary driver unit 18. The secondary driver unit 20 is further configured identically to the primary driver unit 18. In principle, however, a primary driver unit and a secondary driver unit could also be configured differently from one another, in particular if the secondary driver unit is only provided for emergency operation. In addition, the secondary driver unit 20 is switched in parallel to the primary driver unit 18. Consequently, the secondary driver unit 20 is operatively connected to the computing unit 30 and positioned downstream therefrom. In addition, the secondary driver unit 20 is operatively connected to the power electronics system 16. The secondary driver unit 20 is arranged between the computing unit 30 and the power electronics system 16. The secondary driver unit 20 is configured as an integrated electronic circuit. The secondary driver unit 20 is configured as a half bridge driver and/or gate driver. The secondary driver unit 20 is provided in order to actuate at least one of the circuit breakers 40, 42, in particular the same circuit breaker 40, 42 as the primary driver unit 18, and in particular to provide a control voltage and/or a control current for the at least one circuit breaker 40, 42. In the present case, the secondary driver unit 20 is provided by way of example to control all the circuit breakers 40, 42, of the power electronics system 16.

The secondary driver unit 20 is provided at least in the fault operating state for actuating the power electronics system 16. The secondary driver unit 20, in the normal operating state, is in a purely passive mode of operation and/or a standby mode of operation and is provided solely in the fault operating state for actuating the power electronics 16. In the present case, the secondary driver unit 20 is provided in order to replace the primary driver unit 18 in the fault operating state and to actuate the power electronics 16 and consequently to take control of the operation of the electric motor 12. The secondary driver unit 20 is also provided in order to use at least partially the same and/or identical, in particular existing, assemblies and connection lines so as to actuate the power electronics 16 and to actuate the same circuit breakers 40, 42.

In the present case, the primary driver unit 18 and the secondary driver unit 20 are thus connected in parallel and provided in order to actuate the same power electronics 16, wherein the primary driver unit 18 is in the normal operating state and the secondary driver unit 20 is in the fault operating state. In this case, suitable measures must be taken to prevent or at least reduce the flow of current from the active driver unit to the passive driver unit.

For this purpose, the primary driver unit 18 and the secondary driver unit 20 each have integrated tri-state functionality 22, 24, whereby a respective output 46, 48 of the respective driver unit 18, 20 connected to the power electronics system 16 can assume at least three different states, in particular an active state, a deactivated state, and a high-impedance state. To control the respective tri-state functionality 22, 24, the primary driver unit 18 comprises a control pin 26 and the secondary driver unit 20 comprises a further control pin 28.

In the normal operating state, as indicated in particular in FIG. 2 by a closed switch and an open switch, the primary driver unit 18 is in the active state while the secondary driver unit 20 is in the high-impedance state. In the fault operating state, the primary driver unit 18 is replaced by the secondary driver unit 20. Accordingly, the primary driver unit 18 and the secondary driver unit 20 are controlled when the error and/or fault occurs, such that the primary driver unit 18 changes from the active state to the high-impedance state and the secondary driver unit 20 changes from the high-impedance state to the active state. In the fault operating state, the primary driver unit 18 is then in the high-impedance state and the secondary driver unit 20 is in the active state. By this, the outputs 46, 48 of the driver units 18, 20 can be advantageously connected together, while at the same time preventing mutual interference between the driver units 18, 20, for example in the form of short circuits or overlaps.

In the present case, the computing unit 30, which is electrically connected to the control pin 26 and the further control pin 28, is used to switch and/or change the primary driver unit 18 and the secondary driver unit 20. Consequently, the computing unit 30 is configured as a switching unit. Furthermore, the computing unit 30 is configured as a monitoring unit. In the present case, the computing unit 30 is provided to monitor operation of the primary driver unit 18 in the normal operating state and, upon determining a malfunction and/or a failure of the primary driver unit 18, to deactivate the primary driver unit 18 by actuating the further control pin 26 with a corresponding switching signal, in particular by a change to the high-impedance state, and to activate the secondary driver unit 20 by actuating the further control pin 28 with a corresponding switching signal, in particular by a change to the active state. For example, the primary driver unit 18 may comprise an integrated diagnostics routine or self-diagnosis, which determines a corresponding internal error of the primary driver unit 18 and reports to the computing unit 30 to cause a switchover to the secondary driver unit 20. Alternatively, however, if the primary driver unit 18 has a corresponding internal error, it could also be automatically switched to the secondary driver unit 20. Furthermore, a control device could comprise a separate switching unit for switching and/or for changing between a primary driver unit and a secondary driver unit and a monitoring unit configured separately from the switching unit for monitoring operation of the primary driver unit in the normal operating state.

Figure 3:
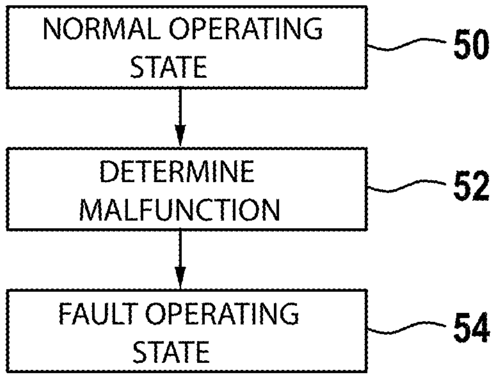

Finally, FIG. 3 shows an exemplary flow diagram with main method steps of an exemplary method for operating the electric motor 12 by means of the control device 10.

A method step 50 corresponds to the normal operating state. The primary driver unit 18 is provided for actuating the power electronics system 16 and is thus in the active state. The secondary driver unit 20, on the other hand, is in a high-impedance state and therefore in a passive and/or inactive state. In addition, by means of the computing unit 30, for example, the operation of the primary driver unit 18 in the normal operating state is monitored.

In a method step 52, a malfunction and/or a failure of the primary driver unit 18 is determined, for example, by means of the computing unit 30. As a result, the primary driver unit 18 is replaced by the secondary driver unit 20. For this purpose, the primary driver unit 18 is deactivated by actuating the control pin 26 with a corresponding switching signal, for example by the computing unit 30, in particular by a change to the high-impedance state, and the secondary driver unit 20 by actuating the further control pin 28 with a corresponding switching signal, for example by the computing unit 30, in particular by a change to the active state.

A method step 54 corresponds to the fault operating state. The secondary driver unit 20 is provided for actuating the power electronics system 16 and is thus in the active state. The secondary driver unit 18, on the other hand, is in a high-impedance state and therefore in a passive and/or inactive state. In this case, an alert can also be generated, for example by means of the computing unit 30, and displayed to an occupant by means of corresponding output means (not shown).

The exemplary flowchart in FIG. 3 is merely intended to describe, by way of example, a method for operating the electric motor 12 by means of the control device 10. In particular, individual method steps can also vary, or additional method steps can be added. For example, a separate monitoring unit can also be used in order to determine a malfunction and/or a failure of the primary driver unit 18. In addition, an additional switching unit could be used to switch and/or change between the primary driver unit 18 and the secondary driver unit 20.

The invention claimed is:

1. A control device for operating an electric motor, comprising:

a power electronics system operably connected to the electric motor;

a primary driver unit operably connected to the power electronics system; and a secondary driver unit (i) connected in parallel with the primary driver unit, and (ii) operably connected to the power electronics system, wherein the primary driver unit and the secondary driver unit each have an integrated tri-state functionality including an active state, a deactivated state, and a high-impedance state, wherein in a normal operating state (i) the primary driver unit is in the active state and only the primary driver unit is configured to actuate the power electronics system, and (ii) the secondary driver unit is in the high-impedance state, and wherein in at least one fault operating state in which a malfunction and/or a failure of the primary driver unit occurs, the secondary driver unit is configured to change from the high-impedance state to the active state and is configured to actuate the power electronics system.

2. The control device according to claim 1, wherein the primary driver unit and the secondary driver unit are each configured as integrated electronic circuitry.

3. The control device according to claim 1, wherein the primary driver unit comprises a control pin for controlling the integrated tri-state functionality of the primary driver unit.

4. The control device according to claim 3, wherein the secondary driver unit comprises a further control pin for controlling the integrated tri-state functionality of the secondary driver unit.

5. The control device according to claim 1, further comprising:

a processor operably connected to the primary driver unit and the secondary driver unit, the processor configured to monitor operation of the primary driver unit in the normal operating state and, upon determination of the malfunction and/or the failure of the primary driver unit, change the primary driver unit from the active state to the deactivated state, and change the secondary driver unit from the high-impedance state to the active state.

6. An actuator assembly, comprising:

an electric motor, and a control device according to claim 1.

7. A steering system having at least one actuator assembly according to claim 6.

8. The control device according to claim 1, wherein the electric motor is an electric motor of a steering system.

9. A method for operating an electric motor using a control device, the method comprising:

actuating a power electronics system operably connected to the electric motor in a normal operating state using only a primary driver unit of the control device, the primary driver unit operably connected to the power electronics system, in the normal operating state the primary driver unit is in an active state and a secondary driver unit is in a high-impedance state; and actuating the power electronics system in a fault operating state, in which a malfunction and/or a failure of the primary driver unit occurs, using only the secondary driver unit by changing the secondary driver unit from the high-impedance state to the active state, wherein the secondary driver unit is operably connected to the power electronics system and is connected in parallel with the primary driver unit, wherein the primary driver unit and the secondary driver unit each have integrated tri-state functionality including the active state, the high-impedance state, and a deactivated state.

* * * * *